July 5, 1960
G. H. SOUCY
2,943,395
MICROMETER SPINDLE CLAMP
Filed Aug. 28, 1958
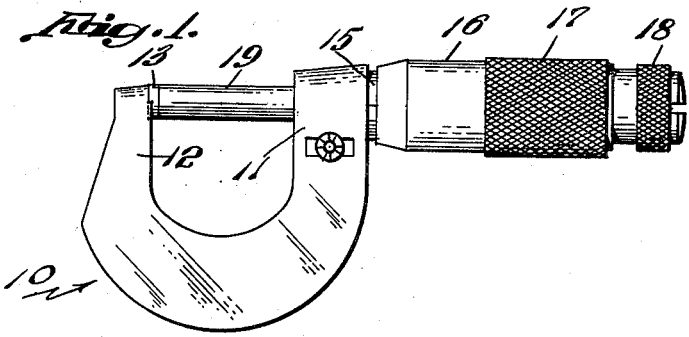
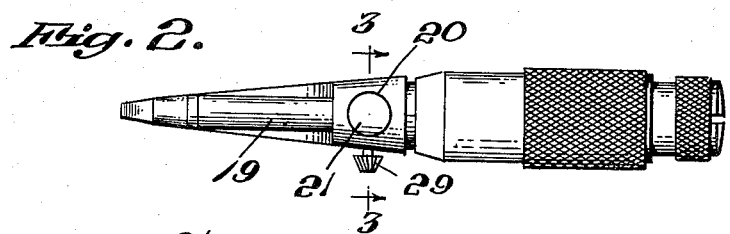
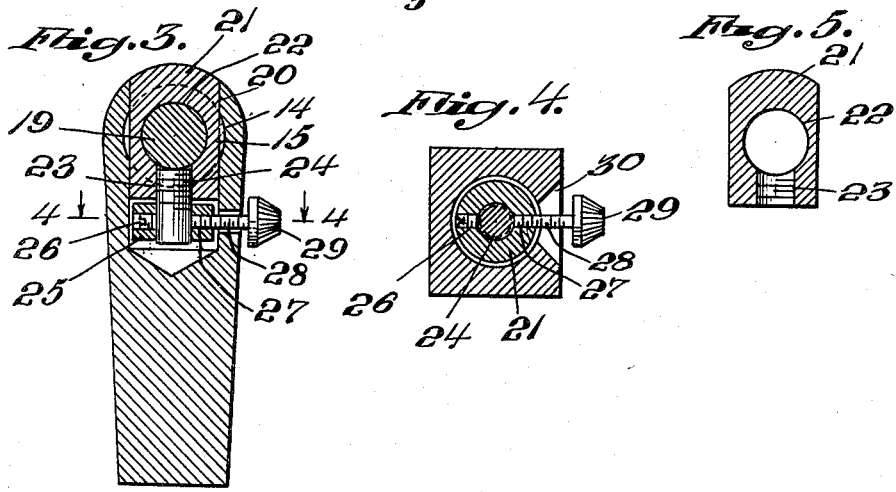
INVENTOR.
George H. Soucy
BY
Barlow & Barlow
ATTORNEYS.

United States Patent Office

2,943,395
Patented July 5, 1960

2,943,395

MICROMETER SPINDLE CLAMP

George H. Soucy, Warwick, R.I., assignor to Brown & Sharpe Manufacturing Company, a corporation of Rhode Island Filed Aug. 28, 1958, Ser. No. 757,770

3 Claims. (Cl. 33—164)

This invention relates to a clamp for the spindle of a micrometer.

It is usual in the use of a micrometer having a U-shaped frame to provide on the side of the frame a rotary nut having a winglike finger piece for clamping the spindle in a particular desired position of adjustment to which it shall be set. Such a nut is somewhat awkward and may interfer because of its relatively large size with the use of micrometer in certain locations.

One of the objects of this invention is to provide a clamp for a spindle which will be largely concealed within the frame and which will have a minimum of material projecting beyond the frame.

Another object of the invention is to provide a clamp which will have only a minimum finger piece extending beyond the frame.

Another object of the invention is to provide a means of adjusting the spindle clamp with reference to the finger piece so that a small angular rotation will cause a clamping action.

With these and other objects in view, the following is a more detailed description of one embodiment of this invention. With reference to the drawings, Figure 1 is a side elevation of a micrometer incorporating this invention.

Figure 2 is a top-plan view thereof.

Figure 3 is a section on line 3—3, Figure 2.

Figure 4 is a section on line 4—4, Figure 3.

Figure 5 is a section view illustrating the plug which is inserted in the micrometer frame.

In proceeding with this invention I have provided an opening in the micrometer frame which intersects the bore for the spindle, and have inserted in this opening a plug which also has a bore through which the spindle extends. In the lower end of this plug, I provide a threaded member upon which there is secured a head. I also provide a slot in the side of the frame which registers with the head and position a finger piece through this slot which will engage the head and through it move the threaded member so that it will engage and clamp the spindle.

With reference to the drawings, 10 designates the micrometer frame which is a solid one-piece metal member, in generally U-shape, having arms 11 and 12 connected by a bridge forming this U. The arm 12 carries the anvil 13 while the arm 11 has an appropriate bore, 14 to receive the barrel 15 upon which a thimble 16 is mounted. The thimble is knurled at 17 and provided with a ratchet attachment 18 and carries the spindle 19 which passes through the arm 11.

In order to clamp the spindle in any desired position, a bore 20 is provided extending into the end of arm 11 across the axis of the spindle 19. This cylindrical bore has its axis in a plane which passes centrally lengthwise through both of the arms 11 and 12. A plug 21, which is also cylindrical as illustrated in the drawing, snugly fits into the bore 20 and extends across the spindle axis and has a bore 22 at right angles to its axis which registers with the bores on either side of the plug in the portions of the arm 11 so that the spindle may extend through the arm 11 and this plug 21.

A bore 23 extends coaxially with the axis of plug 21 and is threaded to receive the threaded member 24 which will engage the spindle 19 as seen in Figure 3 so as to clamp the spindle in position. A head 25 is secured to the threaded member 24 by a set screw 26 which extends radially of the axis of the head and the threaded member 24 and permits an adjustment of this head with reference to the threaded member 24. Rotation of the threaded member 24 is accomplished by the means of an opening 27 in the head which receives the finger piece 28, having a knob 29, and extends from the head outwardly through a slot 30 in the frame as may be seen in Figures 3 and 4. This finger piece 28 is shown as threaded to engage the threaded opening 27 for securing it to the head 25. The head 25 is adjusted on the threaded member 24 so that a slight movement of the head and threaded member will cause engagement with the spindle, and a slight movement in the opposite direction will release the spindle all within the limits of the length of slot 30. The outer end of the plug 21 is curved so as to conform to the curvature of the end of the frame.

It will be apparent that the plug without the finger piece may be adjusted so that the movement of the finger piece which is permitted by the slot 30, will cause a clamping engagement upon a spindle extending through bore 22. This plug may then be put into position in the opening 20 in the frame, with the head 25 in such a location that it will receive the finger piece. The finger piece may then be screwed into position, and the spindle inserted. It will be found that a movement of the finger piece in one direction in the slot will cause endwise movement of the threaded member 24 and its engagement with the spindle while movement of the piece to the other end of the slot will cause a release of the spindle which is the function desired.

The knob 29 of the finger piece is very small and at such a location as to provide a minimum of interference with the operation of micrometer and is in a position which is very handy to be operated by the thumb of the user when a finger of the operator's hand is passed through the opening in the U frame for ease in handling and setting of the micrometer.

I claim:

1. In a micrometer, a U frame, a spindle extending through one of the arms of the frame, a threaded member in said arm having its axis in a plane passing centrally through both arms of the U frame and on an axis at an angle to the axis of the spindle and movable upon rotation toward and from said spindle to engage it, said frame having a slot therein opening to said member, and a finger piece extending through said slot and engaging said member for rotation of the member to cause movement toward and from binding engagement with said spindle.

2. In a micrometer, a U frame having a barrel supported by one arm, a cylindrical opening in the end of the barrel arm of the frame with its axis in a plane passing centrally through both arms of the U frame, a plug in said opening, a spindle extending through the plug and barrel arm of the frame at either side of the plug, a threaded member coaxial with said opening and plug having threaded engagement with said plug and engageable with said spindle, said barrel arm having a slot from its outer face to said opening and a finger piece secured to said member for rotation of the member to cause movement toward and from binding engagement with said spindle.

3. In a micrometer, a U frame having a barrel supported by one arm a cylindrical opening in the end of the barrel arm of the frame with its axis in a plane passing centraly through both arms of the U frame, a plug in said opening, a spindle extending through the plug and barrel arm of the frame at either side of the plug, a threaded member coaxial with said opening and plug having threaded engagement with said plug and engageable with said spindle, a head adjustably secured to said member, said barrel arm having a slot from its outer face to said opening and a finger piece secured to said head for rotation of the frame to cause movement toward and from binding engagement with said spindle.

References Cited in the file of this patent

UNITED STATES PATENTS

| | | |
|---|---|---|
| 781,524 | Humpage | Jan. 31, 1905 |
| 1,446,926 | Parker | Feb. 27, 1923 |
| 2,085,380 | Muller | June 29, 1937 |